United States Patent [19]

Hirota

[11] Patent Number: 4,563,704
[45] Date of Patent: Jan. 7, 1986

[54] NOISE REDUCTION CIRCUIT FOR A VIDEO SIGNAL

[75] Inventor: Akira Hirota, Chigasaki, Japan

[73] Assignee: Victor Company of Japan, Ltd., Yokohama, Japan

[21] Appl. No.: 389,041

[22] Filed: Jun. 16, 1982

[30] Foreign Application Priority Data

Jun. 19, 1981 [JP] Japan .................................. 56-94670
Jun. 19, 1981 [JP] Japan .................................. 56-94671

[51] Int. Cl.$^4$ ......................... H04N 5/21; H04N 9/535
[52] U.S. Cl. ...................................... 358/167; 358/36
[58] Field of Search ............... 358/167, 36, 39, 340, 358/177, 905; 455/296, 303, 304, 307, 308

[56] References Cited

U.S. PATENT DOCUMENTS

| | | | |
|---|---|---|---|
| 3,226,646 | 12/1965 | Ludwig | 455/296 |
| 3,602,737 | 8/1971 | Radecke | 358/167 |
| 3,893,168 | 7/1975 | Beckly | 358/167 |
| 4,009,334 | 2/1977 | Sypula | 358/167 |
| 4,302,768 | 11/1981 | Kamura | 358/36 |
| 4,393,396 | 7/1983 | Raven | 358/167 |

FOREIGN PATENT DOCUMENTS 1550472 8/1979 United Kingdom .

OTHER PUBLICATIONS

Archiv der elektrischen Ubertragung AEU, vol. 18, No. 9, pp. 537-543.

Primary Examiner—Tommy P. Chin
Attorney, Agent, or Firm—Louis Bernat

[57] ABSTRACT

A noise reduction circuit comprises a lowpass filter supplied with a luminance signal having a noise component of an input video signal, for eliminating a high-frequency component including the noise component, a first circuit for subtracting an output signal of the lowpass filter from the luminance signal, in a state where a rise in the level of the luminance signal is delayed by a predetermined time $\tau$ from the start of a rise in the output of the lowpass filter, where the output signal of the lowpass filter has a rise time $\tau$, and a second circuit for amplitude-limiting a subtracted output of the first circuit and subtracting the amplitude-limited output from the luminance signal, to obtain a luminance signal eliminated of the noise.

9 Claims, 11 Drawing Figures

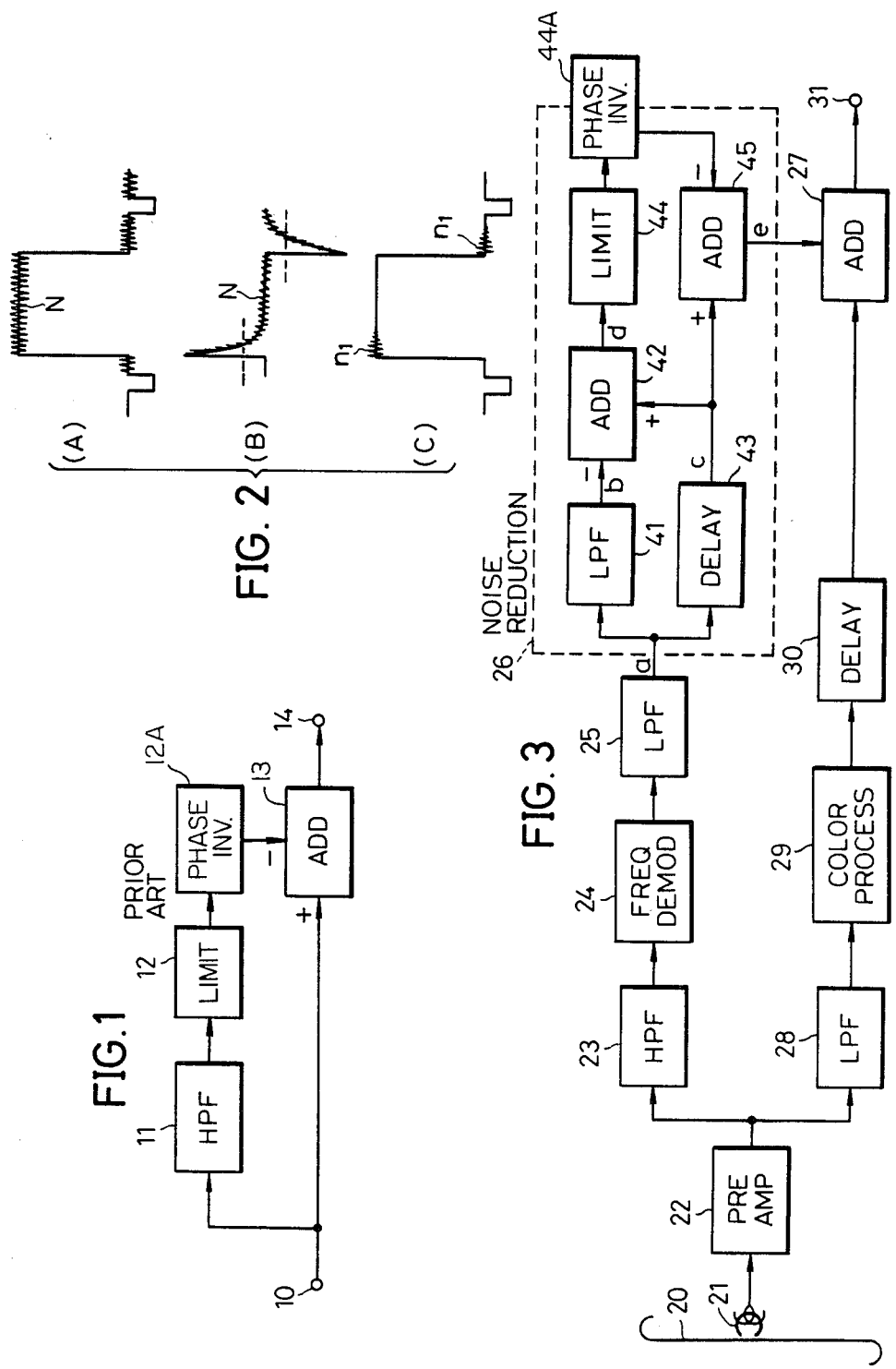

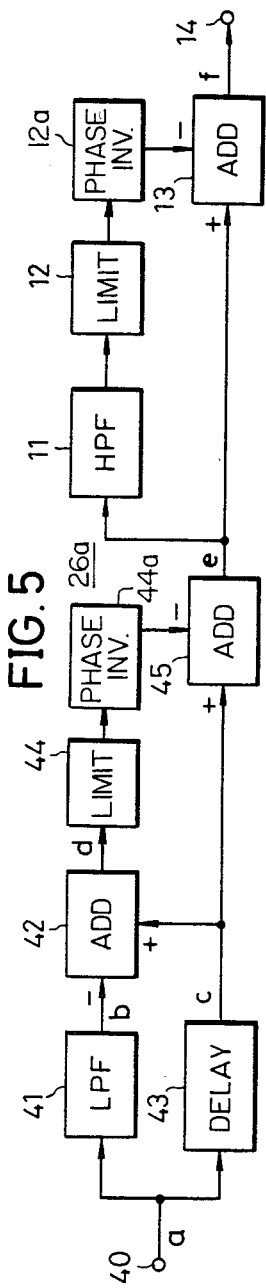
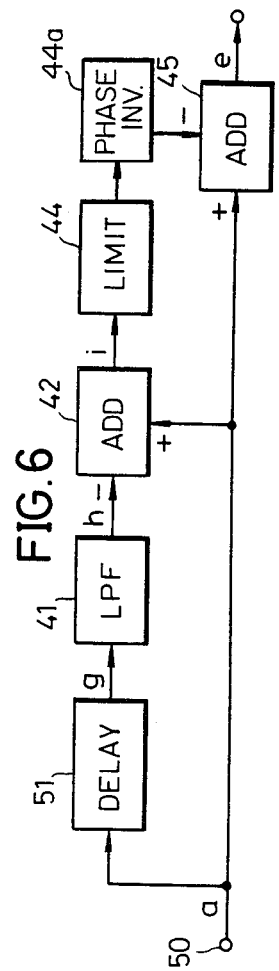
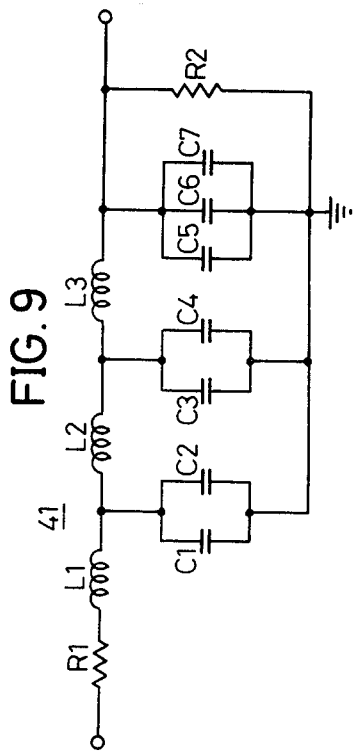
FIG. 5
FIG. 6
FIG. 9

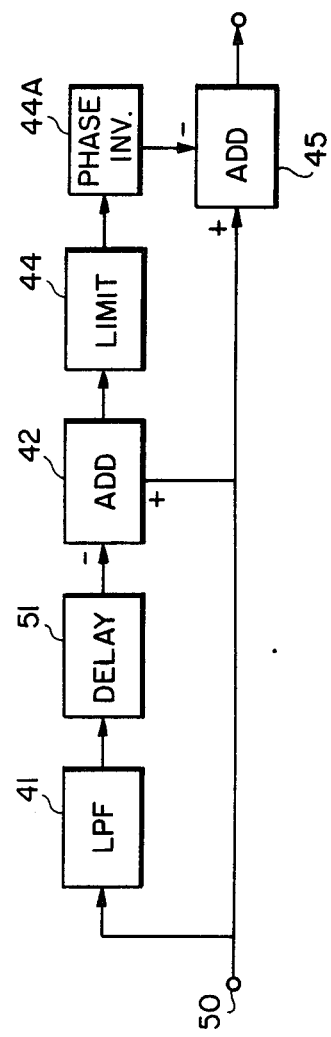

NOISE REDUCTION CIRCUIT FOR A VIDEO SIGNAL

BACKGROUND OF THE INVENTION

The present invention generally relates to noise reduction circuits for video signals, and more particularly to a noise reduction circuit for a video signal capable of effectively eliminating a noise component appearing immediately after a rise in a luminance signal of a reproduced video signal.

Generally, a noise component is mixed within a video signal reproduced from a magnetic tape by a video signal magnetic recording and reproducing apparatus. However, especially the high-frequency component of the luminance signal in the video signal which is recorded and reproduced, is subjected to pre-emphasis, and the luminance signal is frequency modulated after the pre-emphasis is performed. Hence, the frequency of the frequency-modulated signal at parts immediately after a part (rise) where the level of the luminance signal rapidly changes from black level to white level, and immediately after a part (fall) where the level of the luminance signal rapidly changes from white level to black level, is particularly high because of the above preemphasis. Thus, in general, degradation is introduced in the signal-to-noise ratio of the recording and reproducing characteristic in the high-frequency range, in the magnetic recording and reproducing system. Therefore, the signal-to-noise ratio of the luminance signal at the above parts immediately after the rise and fall is poor, and it is highly desirable to positively eliminate the noise at these parts.

However, as will be described later in conjunction with the drawings, the conventional noise reduction circuit for eliminating the noise component in the reproduced luminance signal had a disadvantage in that the noise immediately after the rise in the reproduced luminance signal could not be eliminated effectively.

SUMMARY OF THE INVENTION

Accordingly, it is a general object of the present invention to provide a novel and useful noise reduction circuit for a video signal in which the above described disadvantages have been overcome.

Another and more specific object of the present invention is to provide a noise reduction circuit for a video signal in which, subtraction is performed between a luminance signal passed through a lowpass filter and a luminance signal passed through a delay circuit, and a subtracted output is passed through a limiter wherein subtraction is performed between an amplitude-limited signal and the signal passed through the delay circuit, to obtain a signal eliminated of the noise. According to the circuit of the present invention, even the noise immediately after a rise in the luminance signal can be effectively eliminated.

Still another object of the present invention is to provide a noise reduction circuit for a video signal in which, subtraction is performed a luminance signal passed through a delay circuit and a lowpass filter and an input luminance signal, and a subtracted output is passed through a limiter wherein subtraction is performed between an amplitude-limited signal and the input luminance signal, to obtain a signal eliminated of the noise.

Other objects and further features of the present invention will be apparent from the following detailed description when read in conjunction with the accompanying drawings.

BRIEF DESCRIPTION OF THE DRAWINGS

FIG. 1 is a systematic block diagram showing an example of a conventional noise reduction circuit for a video signal;

FIGS. 2(A) through 2(C) respectively show signal waveforms at each part of the block system shown in FIG. 1;

FIG. 3 is a systematic block diagram showing a video signal reproducing system applied with a noise reduction circuit for a video signal according to the present invention;

FIG. 5 is a systematic block diagram showing a modification of the first embodiment of the circuit according to the present invention shown in FIG. 3;

FIG. 6 is a systematic block diagram showing a second embodiment of a noise reduction circuit for a video signal according to the present invention;

FIG. 9 is a circuit diagram showing an example of a lowpass filter used in the circuit according to the present invention;

FIG. 11 is a block diagram showing a circuit for using a delay filter with a specific delay time for eliminating noise.

DETAILED DESCRIPTION

Figure 4:
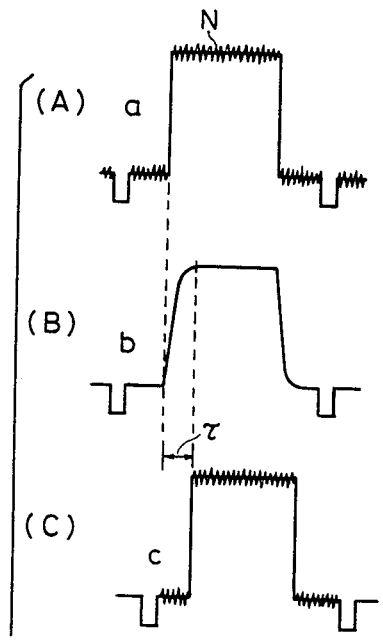
FIGS. 4(A) through 4(F) respectively show signal waveforms at each part of the block system shown in FIG. 3.
Figure 7:
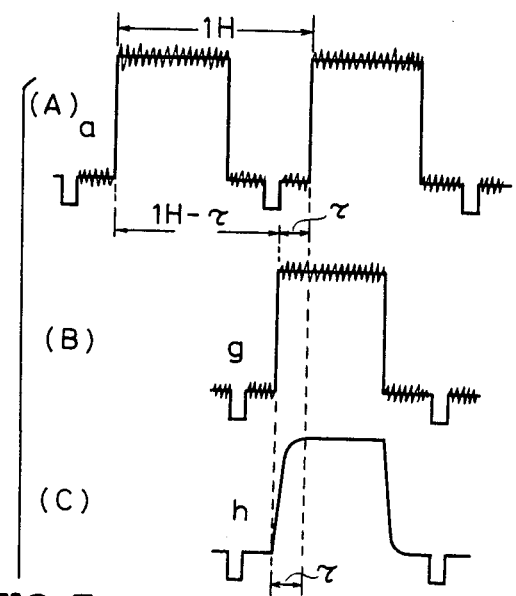
FIG. 7(A) through 7(E) respectively show signal waveforms at each part of the block system shown in FIG. 6.

First, an example of a conventional noise reduction circuit for a video signal will be described in conjunction with FIG. 1. In FIG. 1, a reproduced luminance signal having a noise component N shown in FIG. 2(A), is supplied to a highpass filter 11 from an input terminal 10. The high-frequency component including the noise component N, is eliminated at this highpass filter 11. Because the highpass filter 11 also operates as a differentiating circuit, an output of the highpass filter 11 has a waveform shown in FIG. 2(B). Large amplitude portions of the output of the highpass filter 11 are limited to levels indicated by dotted lines in FIG. 2(B), at a limiter 12. An output of the limiter 12 is supplied to an adder 13 via a phase inverter 12A, and subtraction is performed between the reproduced luminance signal obtained from the terminal 10. Accordingly, as shown in FIG. 2(C), a reproduced luminance signal largely eliminated of the noise component is obtained from a terminal 14.

However, as described above, the output signal of the highpass filter 11 shown in FIG. 2(B) includes large amplitude portions according to the rising part and the falling part of the luminance signal. Thus, these large amplitude portions are amplitude-limited at the limiter 12, and as a result, the noise component which is to be used for mutual cancellation is eliminated. Accordingly, in the reproduced luminance signal shown in FIG. 2(C) which is obtained from the terminal 14, a noise component n1 remains at parts immediately after the rise and fall in the reproduced luminance signal without being eliminated. Because the parts of the luminance signal immediately after the rise from black level to white level and immediately after the fall from white level to black level are emphasized due to the above described pre-emphasis performed, the noise at these parts are emphasized and are highly visible. Hence, the conventional noise reduction circuit had a disadvantage in that the effect of the niose reduction is insufficient.

The present invention has overcome the disadvantages introduced in the above conventional circuit, and description of embodiments of the present invention will hereinafter be given by referring to FIGS. 3 through 10.

FIG. 3 shows a reproducing system applied with an embodiment of a noise reduction circuit according to the present invention. A color video signal reproduced from a magnetic tape 20 by a rotary magnetic head 21, is supplied to a highpass filter 23 and a lowpass filter 28, through a preamplifier 22. The reproduced color video signal is thus separated into a frequency-modulated luminance signal and a frequency-converted carrier chrominance signal. The frequency-modulated luminance signal from the highpass filter 23 is demodulated at a frequency-demodulator 24. A demodulated luminance signal is then eliminated of the unwanted frequency component at a lowpass filter 25, and supplied to a noise reduction circuit 26 according to the present invention. As will be described hereinafter, the niose component in the demodulated luminance signal is eliminated at the noise reduction circuit 26, and supplied to an adder 27.

The frequency-converted carrier chrominance signal from the lowpass filter 28 is frequency-converted at a color processing circuit 29 to be returned into the carrier chrominance signal in the original band, and is subjected to a predetermined signal processing. An output signal of the color processing circuit 29 is supplied to the adder 27 through a delay circuit 30, and is added to the above luminance signal. An output of the adder 27 is obtained from an output terminal 31 as a reproduced color video signal.

Next, description will be given with respect to the construction and operation of the noise reduction circuit 26.

The luminance signal a from the lowpass filter 25 having a noise component N as shown in FIG. 4(A), is supplied to a lowpass filter 41 and a delay circuit 43 within the noise reduction circuit 26. A signal b obtained after the high-frequency component is eliminated at the lowpass filter 25, has a waveform shown in FIG. 4(B). Because the lowpass filter 41 also operates as a type of an integrating circuit, the signal b rises and falls with a time constant $\tau$ as shown in FIG. 4(B). The output signal b of the above lowpass filter 25 is supplied to an adder 42 with an inverted phase, that is, as a subtrahend.

On the other hand, a luminance signal c shown in FIG. 4(C) which is delayed at the delay circuit 43, is supplied to the adder 42 as a minuend. Thus, the signal b from the lowpass filter 41 is subtracted from the luminance signal c. Here, a delay time $\tau$ of the delay circuit 43 is set to a value substantially equal to the time constant $\tau$ in the waveform shown in FIG. 4(B). When the signal b is subtracted from the signal c at the adder 42, a noise component signal d having a waveform shown in FIG. 4(D) is obtained from the adder 42.

Large amplitude portions of the output signal d of the adder 42, are amplitude-limited of the portions exceeding the levels indicated by dotted lines in FIG. 4(D) at a limiter 44. This amplitude-limited signal is supplied to an adder 45 via a phase inverter 44A, that is, as a subtrahend. On the other hand, the signal c delayed at the delay circuit 43, is supplied to the adder 45 as a minuend. Accordingly, the noise component signal from the limiter 44 is subtracted from the signal c from the delay circuit 43. A reproduced luminance signal e shown in FIG. 4(E) which is substantially eliminated of the noise component, is thus obtained from the adder 45.

Because the large amplitude portions of the output signal d of the adder 42 are amplitude-limited at the limiter 44, and the noise component used for mutual cancellation of noise is eliminated, a noise component n2 remains as shown in FIG. 4(E) since the elimination of the noise component is not performed at the adder 45 with respect portions corresponding to the above large amplitude portions. However, the above large amplitude portions of the signal d exist at positions immediately before the rise and fall in the output delayed signal c of the delay circuit 43. Accordingly, the position of the noise component n2 in the signal e is also immediately before the rise from black to white and immediately before the fall from white to black in the signal. Compared to the position (position immediately after the rise and fall) in the conventional example shown in FIG. 2(C), the noise component n2 at this position is not highly visible or conspicuous. Therefore, the effect of the noise component elimination is great according to the circuit of the present invention.

As clearly understood from the description given above, the reproduced luminance signal e obtained from the adder 45 is delayed by a time $\tau$ with respect to the luminance signal a before the noise is eliminated. Thus, the delay circuit 30 is provided in order to match the timing of the carrier chrominance signal and the luminance signal e. The delay time of the delay circuit 30 is set to a value equal to the above delay time $\tau$.

In the circuit according to the present invention, the effect of the noise elimination is large compared to the conventional circuit, because the noise immediately after the rise and fall in the luminance signal is eliminated. But, the noise n2 remains at portions immediately before the rise and fall in the luminance signal. This noise n2 can be eliminated by use of the conventional circuit. When eliminating the above noise n2, a noise reduction circuit in which the circuit shown in FIG. 1 is connected in series at a preceeding stage or succeeding stage of the noise reduction circuit comprising the blocks 41 through 45 in FIG. 3, instead of the noise reduction circuit 26 shown in FIG. 3. An example of such a noise reduction circuit 26a is shown in FIG. 5. In FIG. 5, those parts which are the same as those corresponding parts in FIGS. 1 and 3 are designated by the same reference numerals, and their description will be omitted. In FIG. 5, the luminance signal from the lowpass filter 25 is supplied to a terminal 40. As described above, noise other than the noise n2 shown in FIG. 4(E) is eliminated at the circuit part including the blocks 41 through 45. The noise n2 immediately before the rise and fall in the signal is effectively eliminated at the succeeding blocks 11 through 13, and a reproduced luminance signal f shown in FIG. 4(F) which is completely eliminated of all the noise components, is obtained from the terminal 14 and then supplied to the adder 27.

Next, description will be given with respect to a second embodiment of a noise reduction circuit according to the present invention, by referring to FIG. 6. A luminance signal a shown in FIG. 7(A) which is applied to a terminal 50, is supplied to a delay circuit 51 on one hand to be delayed. The delay time of the delay circuit 51 is selected to (1H−$\tau$). Here, 1H indicates a horizontal scanning period (63.5 $\mu$sec) of the video signal. Thus, as shown in FIG. 7(B), a signal g obtained from the delay circuit 51 is delayed by a time (1H−$\tau$) with respect to the input signal a.

The output signal of the delay circuit 51 is eliminated of the high-frequency component including the niose component at the lowpass filter 41, and a signal h having a waveform shown in FIG. 7(C) is accordingly obtained. The output signal h of the lowpass filter 41 rises and falls with a time constant $\tau$, as in the case of the signal b in the above described first embodiment of the invention. This output signal h of the lowpass filter 41 is supplied to the adder 42 with an inverted phase, that is, as a subtrahend.

On the other hand, the signal a from the input terminal 50 is also directly supplied to the adder 42 as a minuend. Hence, the signal h is subtracted from the signal a at the adder 42, and a noise component signal i having a waveform shown in FIG. 7(D) is obtained from the adder 42. Here, because the signal h is delayed by approximately 1H interval with respect to the signal a from the lowpass filter 41, the signal h is subtracted from the signal a succeeding the signal h before this signal h is delayed, by approximately 1H.

Large amplitude portions of the output signal i of the adder 42, are amplitude-limited of the portions exceeding the levels indicated by dotted lines in FIG. 7(D) at the limiter 44. This amplitude-limited signal is supplied to the adder 45 via a phase inverter 44A, that is, as a subtrahend. On the other hand, the signal a from the terminal 50 is directly supplied to the adder 45 as a minuend. Accordingly, the noise component signal from the limiter 44 is subtracted from the signal a. A reproduced luminance signal e shown in FIG. 7(E) which is substantially eliminated of the noise component, is thus obtained from the adder 45.

Because the large amplitude portions of the output signal i of the adder 42 are amplitude-limited at the limiter 44, and the noise component used for mutual cancellation of noise is eliminated, a noise component remains as shown in FIG. 7(E) since the elimination of the noise component is not performed at the adder 45 with respect to portions corresponding to the above large amplitude portions. However, the above large amplitude portions of the signal i exist at positions immediately before the rise and fall in the signal a of 1H interval thereafter. Accordingly, the portion of the noise component n2 in the signal e is also immediately before the rise from black to white and immediately before the fall from white to black in the signal. The noise component at this position is not highly visible or conspicuous, as described above.

Figure 8:
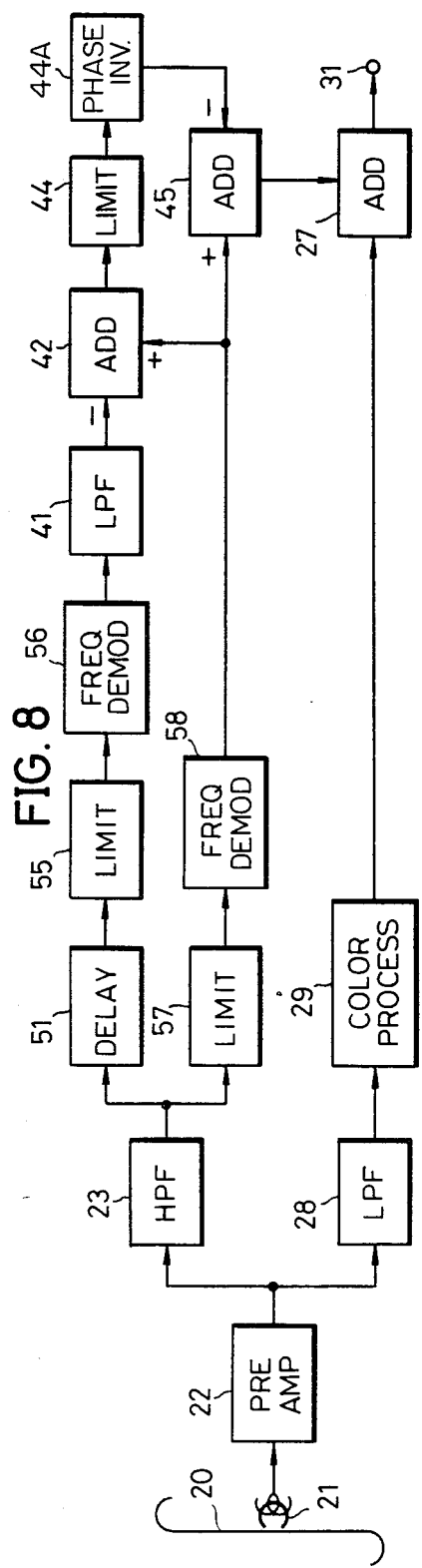
FIG. 8 is a systematic block diagram showing a video signal reproducing system applied with the second embodiment of the circuit according to the present invention shown in FIG. 6.

A reproducing circuit applied with the above second embodiment of the noise reduction circuit according to the present invention, is shown in FIG. 8. In FIG. 8, those parts which are the same as those corresponding parts in FIGS. 3 and 6 are designated by the same reference numerals, and their description will be omitted. In the application shown in FIG. 8, a limiter 55 and a frequency demodulator 56 are provided between the delay circuit 51 and the lowpass filter 41 within the noise reduction circuit shown in FIG. 6. In addition, a limiter 57 and a frequency demodulator 58 are provided in a signal path for directly supplying a signal to the adder 42 as a subtrahend without passing the signal through the delay circuit 51. A delay circuit is not provided in the signal path for supplying a signal to the adder 42 as a subtrahend from the highpass filter 23. Thus, the signal obtained from the adder 45 is not delayed with respect to the carrier chrominance signal. Accordingly, a delay circuit such as that in the above described first embodiment of the invention, is not provided in the signal path of the carrier chrominance signal passing through the lowpass filter 28 and the color processing circuit 29.

Subtraction is performed between the luminance signal having the noise component and the noise component of 1H interval before, at the adder 45. However, because there is a line correlation in the noise component, no inconveniences will be introduced even if the noise signal of the luminance signal at a certain position is cancelled with the noise signal of 1H interval before that signal. Therefore, the elimination of the noise component can be performed positively.

According to the second embodiment of the present invention, the delay time in the delay circuit 51 is close to 1H. Thus, a glass delay line having fine characteristics may be used as the delay circuit 51. Further, as compared to the above first embodiment of the invention, a delay circuit is not required in the carrier chrominance signal system. Accordingly, a fine reproduced signal having no delay, fine characteristics, and in which the noise component is eliminated, can be obtained from the output terminal 31.

In the present second embodiment of the invention, the conventional circuit may be used together as in the modification shown in FIG. 5, in order to eliminate the noise n2.

Moreover, in FIGS. 6 and 8, the delay circuit 51 is provided at a stage preceeding the lowpass filter 41. However, the delay circuit 51 may be provided between the lowpass filter and the adder 42 as shown in FIG. 11.

Figure 10:
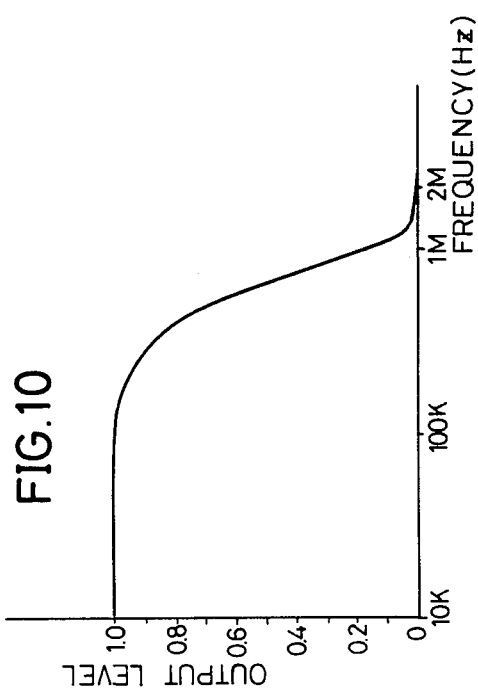
FIG. 10 is a graph showing a frequency characteristic of the lowpass filter shown in FIG. 9.

In each of the above described embodiments of the invention, the time constant $\tau$ of the lowpass filter 41 is selected to a value in the range of 0.5 $\mu$sec to 2 $\mu$sec, for example. An example of a concrete circuit of the lowpass filter 41 is shown in FIG. 9. The circuit construction is a known six-order Bessel lowpass filter, and the circuit constants are selected as follows:

Resistors R1=R2: 1 k$\Omega$
Coils L1: 47 $\mu$H, L2: 220 $\mu$H, L3: 390 $\mu$H
Capacitors C1: 100 pF, C2: 33 pF, C3: 270 pF, C4: 15 pF, C5: 180 pF, C6: 56 pF, C7: 12 pF The frequency characteristic of this lowpass filter 41 is shown in FIG. 10, wherein the rising time constant $\tau$ is 1.5 $\mu$sec.

In each of the above embodiments of the invention, the limiting level of the limiter 44 indicated by the dotted lines in FIGS. 4(D) and 7(D) is selected to a value in the range of 0.05 to 0.07, for example, if the level between the sink tip to the white peak of the input luminance signal a is assumed to be 1.

Further, the present invention is not limited to these embodiments, but various variations and modifications may be made without departing from the scope of the present invention.

What is claimed is:

1. A noise reduction circuit comprising:

lowpass filter means supplied with an input luminace signal having a noise component of an input video signal, said lowpass filter means having a characteristic which eliminates a high-frequency component including said noise component;

delay means for delaying said input luminance signal by a predetermined time period $\tau$ so that an output signal of said delay means has a leading edge which occurs after said predetermined time period $\tau$, said time period beginning at the start of a rise in an output signal of said lowpass filter means, said predetermined time period $\tau$ being equal to a rise time of the output signal of said lowpass filter means;

first subtraction means comprising a first adder means which is directly supplied with the output signals of said delay means and is supplied with the output signal of said lowpass filter means via a first phase inverting means for subtracting the output signal of said lowpass filter means from the output signal of said delay means;

limiter means for amplitude-limiting an output signal of said first subtraction means; and second subtraction means comprising a second adder means which is directly supplied with the output signal of said delay means and is supplied with the output signal of said limiter via a second phase inverting means for subtracting an output signal of said limiter means from the output signal of said delay means to produce a luminance signal from which said noise component has been substantially eliminated.

2. A noise reduction circuit as claimed in claim 1 in which said predetermined time period $\tau$ is a value in a range of 0.5 $\mu$sec to 2.0 $\mu$sec.

3. A noise reduction circuit as claimed in claim 2 in which said predetermined time period $\tau$ is a value in the order of 1.5 $\mu$sec.

4. A noise reduction circuit as claimed in claim 1 further comprising a highpass filter means for obtaining a high-frequency component of the output signal of said second subtraction means, means for amplitude-limiting an output signal of said highpass filter means, and means for subtracting this amplitude-limited output from the output signal of said second subtraction means to produce a luminance signal from which noise components included along a waveform of the input luminance signal have been completely eliminated.

5. A noise reduction circuit comprising:

delay means supplied with an input luminance signal having a noise component of an input video signal for delaying the luminance signal by a predetermined time period (1H$-\tau$), where 1H represents one horizontal scanning period of the video signal;

lowpass filter means supplied with a delayed output luminance signal of said delay means for eliminating a high-frequency component including said noise component, said lowpass filter means producing an output signal having a predetermined rise time $\tau$;

first subtraction means comprising a first adder means which is directly supplied with the output signal of said delay means and is supplied with the output signal of said lowpass filter means via a first phase inverting means for subtracting the output signal of said lowpass filter means form said input luminance signal;

limiter means for amplitude-limiting an output signal of said first subtraction means; and second subtraction means comprising a second adder means which is directly supplied with the output signal of said delay means and is supplied with the output signal of said limiter via a second phase inverting means for subtracting an output signal of said limiter means from said input luminance signal to produce a luminance signal from which said noise component is substantially eliminated.

6. A noise reduction circuit as claimed in claim 5 in which said first subtraction means comprises a first adder means directly supplied with said input luminance signal and supplied with the output signal of said lowpass filter via a phase inverting means, and said second subtraction means comprises a second adder means directly supplied with said input luminance signal and supplied with the output signal of said limiter means via another phase inverting means.

7. A noise reduction circuit as claimed in claim 5 in which said predetermined time period $\tau$ is a value in a range of 0.5 $\mu$sec to 2.0 $\mu$sec.

8. A noise reduction circuit as claimed in claim 7 in which said predetermined time period $\tau$ is a value in the order of 1.5 $\mu$sec.

9. A noise reduction circuit comprising:

lowpass filter means supplied with an input luminance signal having a noise component for eliminating a high-frequency component including said noise component, said lowpass filter means producing an output signal having a predetermined rise time $\tau$;

delay means for delaying the output signal of said lowpass filter means by a predetermined time (1H$-\tau$), where 1H represents one horizontal scanning period of the video signal;

first subtraction means comprising a first adder means which is directly supplied with the output signal of said delay means and is supplied with the output signal of said lowpass filter means via a first phase inverting means for subtracting an output signal of said delay means from said input luminance signal;

limiter means for amplitude-limiting an output signal of said first subtraction means; and second subtraction means comprising a second adder means which is directly supplied with the output signal of said delay means and is supplied with the output signal of said limiter via a second phase inverting means for subtracting an output signal of said limiter means from said input luminance signal to produce a luminance signal from which said noise component is substantially eliminated.

* * * * *